United States Patent
Perkins et al.

(10) Patent No.: US 9,519,133 B2
(45) Date of Patent: Dec. 13, 2016

(54) VARIABLE MODULATION OF RADIATION AND COMPONENTS

(75) Inventors: David L. Perkins, The Woodlands, TX (US); Christopher Michael Jones, Houston, TX (US); Michael T. Pelletier, Houston, TX (US); Li Gao, Katy, TX (US); Robert Atkinson, Conroe, TX (US); William Soltmann, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 34 days.

(21) Appl. No.: 14/420,178

(22) PCT Filed: Aug. 7, 2012

(86) PCT No.: PCT/US2012/049841
§ 371 (c)(1),
(2), (4) Date: Feb. 6, 2015

(87) PCT Pub. No.: WO2014/025340
PCT Pub. Date: Feb. 13, 2014

(65) Prior Publication Data
US 2015/0192773 A1    Jul. 9, 2015

(51) Int. Cl.
*G02B 26/04* (2006.01)
*G01J 1/02* (2006.01)
(Continued)

(52) U.S. Cl.
CPC .............. *G02B 26/04* (2013.01); *E21B 47/00* (2013.01); *G01J 1/0228* (2013.01); *G01J 1/0295* (2013.01);
(Continued)

(58) Field of Classification Search
CPC ........ E21B 47/00; G01J 1/0228; G01J 1/0295; G01J 1/0444; G01J 1/0492; G01J 1/20; G01J 1/22; G01J 1/28; G01J 1/42; G01J 1/46; G01J 3/0235; G01J 3/027; G01J 3/0297; G01V 8/10; G02B 26/04

See application file for complete search history.

(56) References Cited

U.S. PATENT DOCUMENTS 6,002,488 A    12/1999  Berg et al.
2008/0259318 A1  10/2008  Pan et al.

FOREIGN PATENT DOCUMENTS

GB            1183472 A        3/1970
WO     WO-2010112679 A1      10/2010

OTHER PUBLICATIONS

"International Application Serial No. PCT/US2012/049841, International Preliminary Report on Patentability mailed Nov. 10, 2014", 23 pgs.

(Continued)

*Primary Examiner* — Mark R Gaworecki
(74) *Attorney, Agent, or Firm* — Schwegman Lundberg & Woessner, P.A.; Benjamin Fite

(57) ABSTRACT

Various embodiments include systems and methods to provide selectable variable gain to signals in measurements using incident radiation. The selectable variable gain may be used to normalize signals modulated in measurements using incident radiation. The selectable variable gain may be attained using a number of different techniques or various combinations of these techniques. These techniques may include modulating a modulator having modulating elements in which at least one modulating element acts on incident radiation differently from another modulating element of the modulator, modulating the use of electronic components in electronic circuitry of a detector, modulating (Continued)

a source of radiation or combinations thereof. Additional apparatus, systems, and methods are disclosed.

16 Claims, 8 Drawing Sheets

(51) Int. Cl.
| | |
|---|---|
| *G01J 1/04* | (2006.01) |
| *G01J 1/22* | (2006.01) |
| *G01J 1/20* | (2006.01) |
| *G01J 1/28* | (2006.01) |
| *G01J 1/42* | (2006.01) |
| *G01J 1/46* | (2006.01) |
| *G01J 3/02* | (2006.01) |
| *E21B 47/00* | (2012.01) |
| *G01V 8/10* | (2006.01) |

(52) U.S. Cl.
CPC ............ *G01J 1/0444* (2013.01); *G01J 1/0492* (2013.01); *G01J 1/20* (2013.01); *G01J 1/22* (2013.01); *G01J 1/28* (2013.01); *G01J 1/42* (2013.01); *G01J 1/46* (2013.01); *G01J 3/027* (2013.01); *G01J 3/0235* (2013.01); *G01J 3/0297* (2013.01); *G01V 8/10* (2013.01)

(56) References Cited

OTHER PUBLICATIONS

"International Application Serial No. PCT/US2012/049841, International Search Report mailed Jun. 28, 2013", 6 pgs.

"International Application Serial No. PCT/US2012/049841, Invitation to Pay Additional Fees and Partial Search Report mailed Apr. 25, 2013", 7 pgs.

"International Application Serial No. PCT/US2012/049841, Written Opinion mailed Jun. 28, 2013", 11 pgs.

"International Application Serial No. PCT/US2012/049841, Written Opinion mailed Aug. 8, 2014", 8 pgs.

"European Application Serial No. 12750511.3, Office Action mailed Mar. 6, 2015", 2 pgs.

"European Application Serial No. 12750511.3, Response filed Aug. 5, 2015 to Office Action mailed Mar. 6, 2015", 19 pgs.

"International Application Serial No. PCT/US2012/049841, Response filed May 30, 2014 to Written Opinion mailed Jun. 28, 2013", 10 pgs.

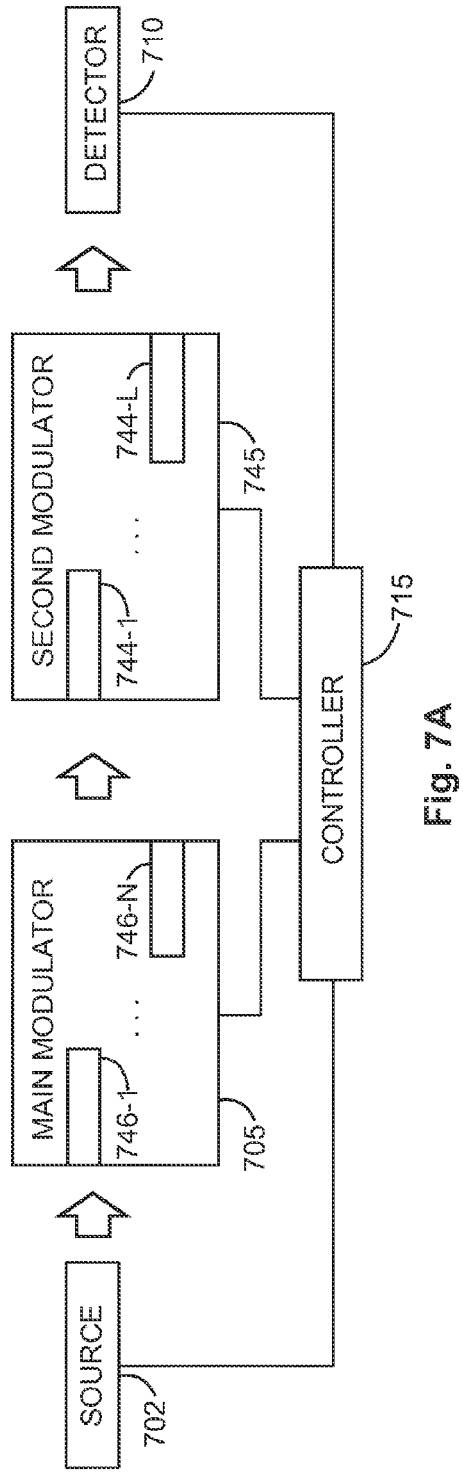
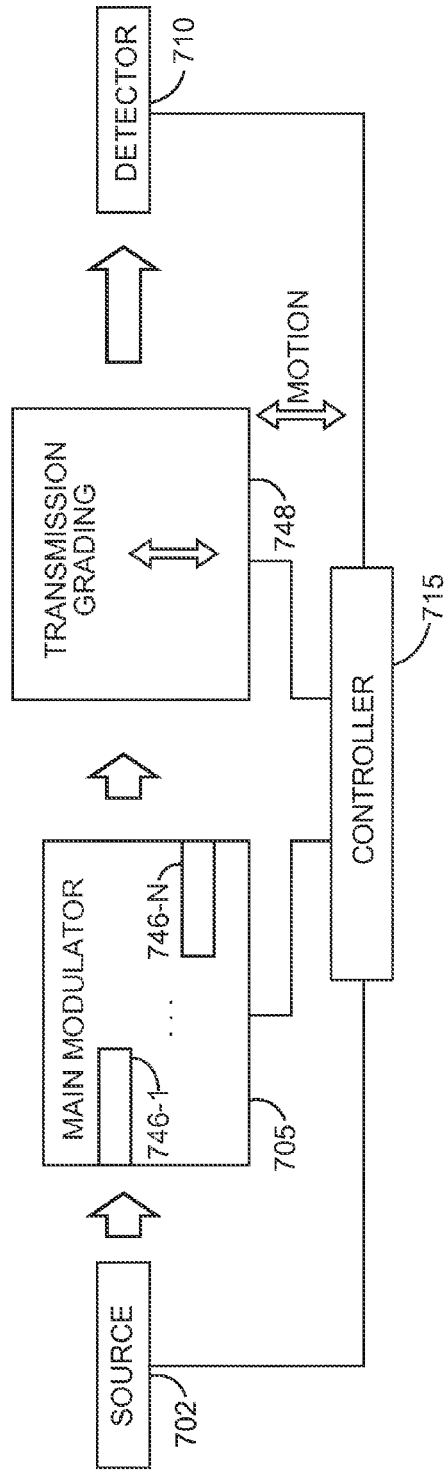
Fig. 7A
Fig. 7B

```
┌─────────────────────────────────────────────────────────────────┐
│ Receive Radiation at a Modulator and Pass, Towards a Detector,  │
│ the Received Radiation Modulated by Modulating Elements of the  │
│ Modulator                                                       │
└─────────────────────────────────────────────────────────────────┘
                              │           ─910
┌─────────────────────────────────────────────────────────────────┐
│ Control the Modulator such that, in Each Period of Operation of │
│ the Modulator on the Received Radiation, Output of the Detector │
│ from Receiving Modulated Radiation from Each Modulating Enement │
│ has a Normalized Amplitude                                      │
└─────────────────────────────────────────────────────────────────┘
                                          ─920
```

Fig. 9

```
┌─────────────────────────────────────────────────────────────────┐
│ Receive Radiation at a Modulator and Pass, Towards a Detector,  │
│ the Received Radiation Modulated by Modulating Elements of the  │
│ Modulator                                                       │
└─────────────────────────────────────────────────────────────────┘
                              │           ─1010
┌─────────────────────────────────────────────────────────────────┐
│ Adjust a Component in Electronic Circuitry of the Detector such │
│ that Output of the Detector from Receiving Modulated Radiation  │
│ from each Modulating Elememt has a Normalized Amplitude         │
└─────────────────────────────────────────────────────────────────┘
                                          ─1020
```

Fig. 10

```
┌─────────────────────────────────────────────────────────────────┐
│ Modulate a Source of Radiation and Direct the Radiation from    │
│ the Source to a Modulator                                       │
└─────────────────────────────────────────────────────────────────┘
                              │           ─1110
┌─────────────────────────────────────────────────────────────────┐
│ Hold an Effective Frequency of the Modulator Constant as the    │
│ Radiation from the Modulator is Passed Towards a Detector such  │
│ that, in Each Period of Operation of the Modulator on the       │
│ Radiation, Output of the Detector from Receiving Modulated      │
│ Radiation from Each Modulating Element has a Normalized         │
│ Amplitude                                                       │
└─────────────────────────────────────────────────────────────────┘
                                          ─1120
```

Fig. 11

VARIABLE MODULATION OF RADIATION AND COMPONENTS

PRIORITY APPLICATIONS

This application is a U.S. National Stage Filing under 35 U.S.C. 371 from International Application No. PCT/US2012/049841, filed on 7 Aug. 2012, and published as WO 2014/025340 on 13 Feb. 2014, which application and publication are incorporated herein by reference in their entirety.

TECHNICAL FIELD

The present invention relates generally to apparatus and methods of making measurements using radiation.

BACKGROUND

Radiation transducers, such as radiation detectors, convert radiant power to an electrical signal or other physical property that is then converted to an electrical signal. The other physical properties may include resistance, heat, or other measureable property. Radiation transducers generally are chosen for particular applications by ascertaining their properties, which can include sensitivity, dark current, impedance, noise, and frequency response. A detector's frequency response can be correlated to its ability to detect rapid changes in the radiation incident on the detector.

In many cases, it is desirable to operate radiation transducers in an alternating current (AC) mode, where the radiation being measured is modulated in time, usually with a chopper wheel that alternates the radiation by allowing or not allowing radiation to pass between the radiation source and a detector. Another approach to modulating the signal includes the use of electronic gating circuits on the output side of the transducer. Operating a radiation detector in AC mode allows for improved measurements by removing slow signal drifts. Typically, the modulation of the chopper wheel is consistent in its frequency, i.e., the chopping rate is constant. An optical system consisting of a light source, a chopper wheel, a detector, and optics to convey light from the source to the detector can be used with a transmission cell containing a chemical mixture to study the chemical mixture. With light input with constant amplitude, with a uniform chopper wheel, and with a detector having a very fast frequency response, a derived signal from the detector would ideally approach a rectangular wave signal, which quickly rises to a maximum value and falls to zero when the radiation is alternately allowed to pass the chopping mechanism.

In practice, most systems do not behave ideally to produce a perfect rectangular wave signal. Oftentimes, the optical system is chopped at a relatively high rate to move the systems frequency away from other noise sources, such as 60 Hz electrical noise, to allow for improved signal-to-noise (S/N) ratios. As a result, real detector signals resemble sinusoidal waveforms as the chopping speed approaches the detectors response frequency.

BRIEF DESCRIPTION OF THE DRAWINGS

FIG. 7A shows an example of an embodiment of an arrangement of a second modulator operable with a main modulator in a system that can be implemented in measurement applications, in accordance with various embodiments.

FIG. 7B shows a structure that can be implemented as the second modulator of FIG. 7A, in accordance with various embodiments.

FIGS. 9-11 show features of an example methods to control measurement signals, in accordance with various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1A:
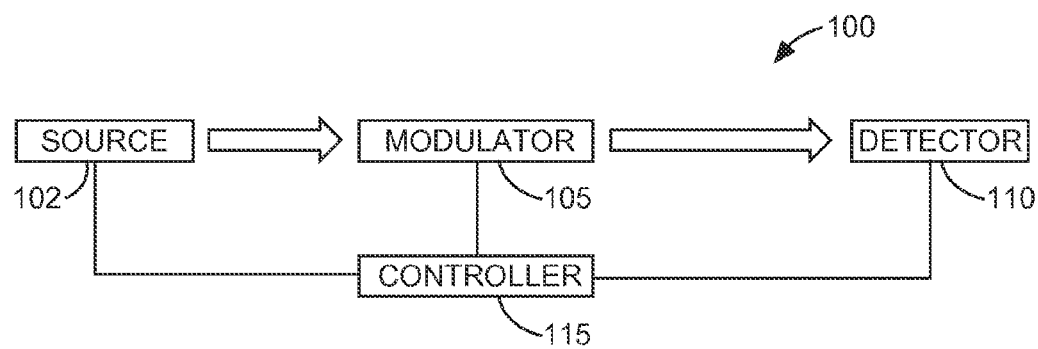
FIG. 1A shows a block diagram of example arrangements of a system that can be implemented in measurement applications, in accordance with various embodiments.

FIG. 1A shows a block diagram of example embodiments of arrangements of a system 100 that can be implemented in measurement applications. These measurement applications can be radiation based measurements. Radiation can include electromagnetic radiation, which can be referred to as light not limited to the visible spectrum of electromagnetic radiation. The system 100 can include one or more of a source 102, a modulator 105, a detector 110, and a controller 115, where one more of the source 102, the modulator 105, and the detector 110 can be controlled such that selectable variable gain is provided for received modulated radiation in the detector 110 corresponding to the modulating elements. Such gain may be variable corresponding to particular modulating element, while being selectable such that the variable gain can be applied to a signal corresponding to a selected modulating element. Control of the one or more of the source 102, the modulator 105 and the detector 110 can include modulation of one or more of the source 102, the modulator 105, and the detector 110. The selectable variable gain may be provided with the source 102, the modulator 105, and the detector 110 arranged to allow for the signal amplitude in the detector 110 corresponding to the modulating elements to be normalized. The modulator 105 can be structured having a plurality of modulating elements in which at least one of the modulating elements modulates received radiation differently from at least one other of the modulating elements.

Figure 1B:
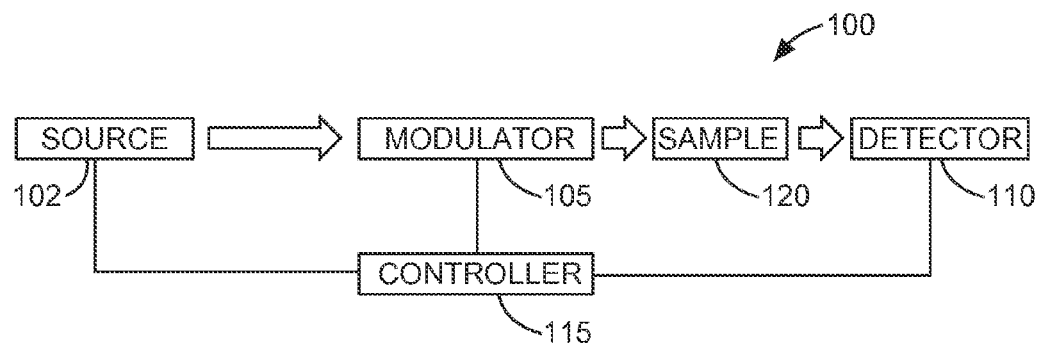
FIG. 1B shows a block diagram of example arrangements of the system of FIG. 1A that can be implemented in measurement applications on an inserted sample, in accordance with various embodiments.

FIG. 1B shows a block diagram of example embodiments of arrangements of the system 100 of FIG. 1A that can be implemented in measurement applications on the inserted sample 120. The sample 120 can be inserted between the modulator 105 and the detector 110. Depending on the modulator 105 and its transmissive characteristics, the sample 120 may be inserted between the source 102 and the modulator 105. The parameters for the modulation of the one or more of the source 102, the modulator 105, and the detector 110 to provide selectable variable gain, for example, with respect to a period of the modulator 105 can be determined with the sample 120 inserted in system. The period of the modulator 105 can correspond to a time interval to conduct a sequence through the modulating elements of the modulator 105. For the modulator 105 arranged to include a chopper wheel, the period of the chopper wheel is the time to complete a rotation of the chopper wheel. With the sample 120 inserted in the system 100, the selectable variable gain may be provided with the source 102, the modulator 105, and the detector 110 arranged to allow for the signal amplitude from the detector 110 corresponding to the modulating elements to be normalized.

Figure 2A:
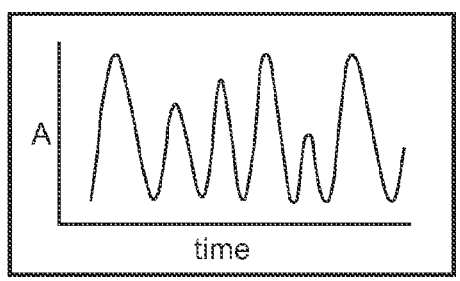
FIG. 2A shows an example signal output from the detector of FIG. 1A or FIG. 1B, without normalizing control provided, in accordance with various embodiments.
Figure 2B:
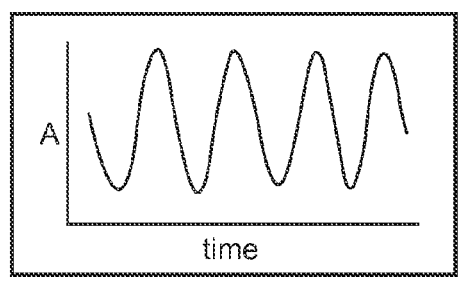
FIG. 2B shows an example signal output from the detector of FIG. 1A or FIG. 1B, with normalizing control provided, in accordance with various embodiments.

FIG. 2A shows an example signal output from the detector 110, without normalizing control provided, in which the amplitude of the signal from the modulating elements of the modulator 105 is different. For example, FIG. 2A shows that the fifth modulating element passes a much lower amplitude than the other modulating elements when the modulating frequency of the modulator 105 is held constant. Therefore, the S/N for this modulating element is lower than that of the other modulating elements. This situation can occur when using a chopper wheel at a constant speed in which the light passing sections of the chopper wheel pass the light differently. FIG. 2B illustrates the output signal with the system 100 arranged to provide a normalizing output. Arrangement of the system 100 can be selected based on an arrangement to maximize the S/N of the individual modulating elements of the modulator 105.

The system 100 can be structured in a number of different arrangements. For example, the controller 115 can be structured to control the modulator 105 to provide a normalizing output. The controller 115 can be structured to control the detector 110 to provide a normalizing output. The controller 105 can be structured to control the source 102 to provide a normalizing output. The controller 105 can be structured to control various combinations of the source 102, the modulator 105, and the detector 110 to provide a normalizing output. The system 100 in these various arrangements can allow for enhanced signal-to-noise-ratio on signals measured by radiation transducers such as a radiation transducer in the detector 110.

Figure 3:
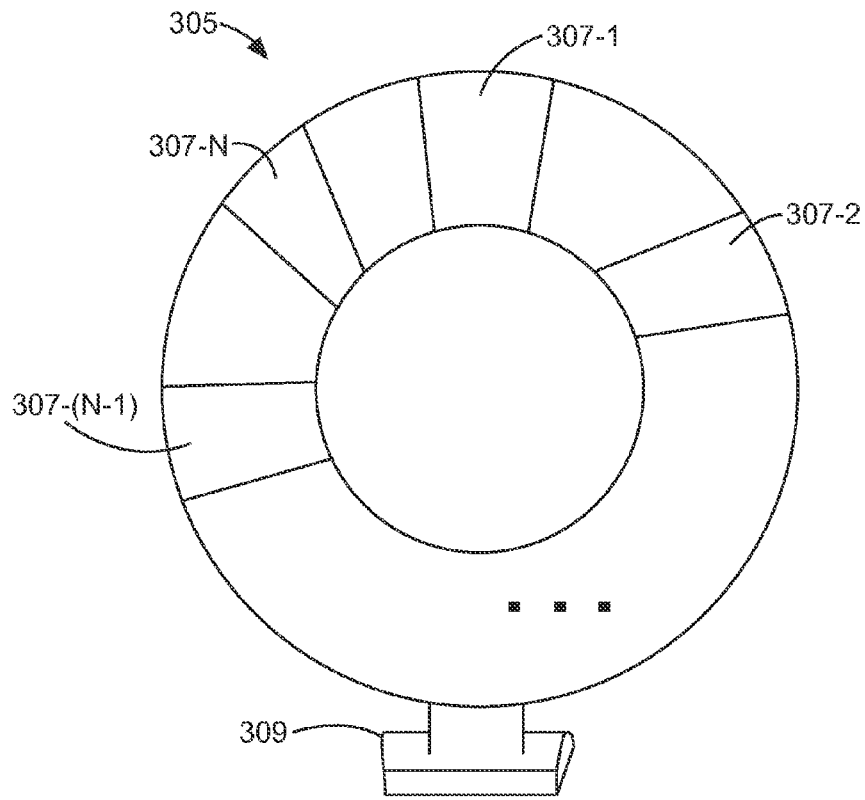
FIG. 3 shows a representation of a modulator having a plurality of modulating elements, in accordance with various embodiments.

FIG. 3 shows a modulator 305 having a plurality of modulating elements 307-1 . . . 307-N in which at least one of the modulating elements modulates received radiation differently from at least one other of the modulating elements. Modulating elements 307-1 . . . 307-N can be arranged as transmissive elements with the areas between each modulating element structured to block the passage of light. The transmissive property of each element 307-I ($1 \leq I \leq N$) may be different from all the other modulating elements. Various elements of the modulating elements 307-1 . . . 307-N, but not all the modulating elements 307-1 . . . 307-N, may have the same or approximately the same transmissive property. The modulator 305 can be structured as a chopper wheel having a plurality of transmissive elements. Modulating elements 307-1 . . . 307-N can be structured as optical filters. The optical filters implemented may pass light at various wavelengths ranging from less than 20 nanometers to hundreds of nanometers. The optical filter implemented may pass light at various wavelengths with a weighting function applied to the individual wavelengths, such as a neutral density filter, an integrated computational element (ICE), a liquid crystal tunable filter (LCTF). Those skilled in the art can recognize the different types of optical filters and their use in optical systems. The modulator 305 can include a drive unit 309 operable to selectively change the speed of rotation of the modulator 305 during a rotation of the modulator 305.

In various embodiments, the system 100 can be structured to modulate the modulating mechanism of the modulator 105. For example, with the modulator 105 realized using a chopping wheel containing elements which themselves each modify the radiation differently, the controller 115 can modulate the chopping frequency of the modulator 105, which can be realized using the modulator 305 of FIG. 3. The chopping frequency can be modulated directed towards a modulation to maximize the S/N of the individual modulating elements of the modulator 105. By changing the chopper's speed over the course of each revolution in this example, a detector with a constant frequency response can allow for the signal amplitude corresponding to each modulating element to be normalized. Rotation of a chopper wheel can be slowed down while a particular filter having low transmission is passing light from the source 102 such that the resulting signal is increased by having more time for light to pass through this filter element of the chopping wheel. Taking this approach for every filter element of the chopping wheel, each signal corresponding to a particular filter can be normalized. The normalization can be conducted such that each focused response with respect to one another approaches a sinusoidal-like wave as shown in FIG. 2B. Such normalization provides for moving a low transmission signal to a level of a high transmission signal from the chopper wheel. Thus, low amplitude signals at constant chopping speeds can achieve a higher S/N with the system 100 using variable chopping speeds instead of the constant chopping speed. Changing the speed of the chopper wheel provides variable chopping speeds that can be used to transform the signal shown in FIG. 2A to the signal in FIG. 2B. The controller 115 can be structured to provide control signals that drive the rotation of the modulator 105 such as the modulator 305 of FIG. 3.

By modulating the speed of the chopper wheel having a number of different optical filters, dwell time for light from a source for any individual optical filter can be increased or decreased. The modulated chopper wheel can be viewed in terms of treating the dwell time for any individual optical filter as a variable gain in an automatic gain circuit. For normalization, there corresponds a threshold that can be maintained by controlling the speed of the chopper wheel in each revolution of the chopper wheel. Controlling the speed of the chopper wheel can change the dwell time of the filters in the optical train. Leaving a low transmissive filter in the path of the light for a longer time can provide for integration and for obtaining a better signal-to-noise ratio. If the optical filter in the path of the light is a higher transmissive filter, it can be in the optical path from the source for a much shorter time. Modulating the speed of the chopper wheel may approach an optimization of the total number of light measurements that can be taken, while attaining a relatively high signals noise ratio.

The modulator 105 may be realized in a number of different structures to provide a normalized signal. For example, the modulator 105 can include the modulator 305 of FIG. 3 structured like a chopper wheel set to operate at a constant speed with variable filter elements, and a variable optical amplifier. The chopper wheel can be arranged with the variable optical amplifier such that light passed by the chopper wheel can be operated on with the variable optical amplifier such processed light can be passed through a detector such as detector 110 of FIGS. 1A and 1B. The light from the variable optical amplifier of the modulator 105 can be used to analyze a sample disposed between the modulator 105 and the detector 110. The controller 115 can provide control signals synchronized with the chopper wheel such that optical amplification is applied to optical signals from the chopper wheel that have been processed by a filter elements with lower transmissive characteristics as compared to other filter elements. The control signals can be on/off signals or a waveform of drive signals, such as constant drive signals having different levels with each level selected with respect to a respective filter element of the chopper wheel over a time interval in which the respective filter element passes light originating from the source 102, where the sum of the time intervals equals the period of the chopper wheel revolution.

In various embodiments, the system 100 can be structured to perform a normalizing transformation in the electrical domain controlling the use of electronic circuitry associated with the detector 110. A switch can be used in conjunction with a resistive-capacitive (RC) circuit on an output of the detector 110 to affect the time constant of the system 100. By switching a capacitor in the RC circuit synchronous with the position of the modulating elements provides such an effect to the system's time constant. By changing the RC circuit, the detector's response characteristics, such as its frequency response, can be changed. The synchronization can be accomplished by time, an optical measurement of the wheel, optical resolvers designed to measure the wheel position. Having an accurate data of the wheel position provides a parameter from which to generate a time at which to change the RC circuit.

Figure 4:
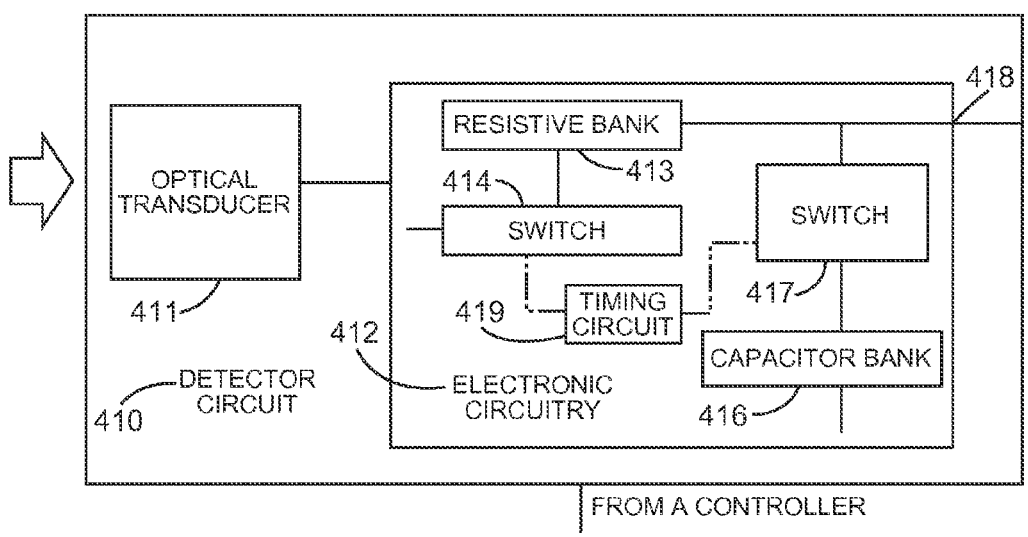
FIG. 4 shows a block diagram of features of an example detector circuit having selectable resistance-capacitance circuit, in accordance with various embodiments.

FIG. 4 shows a block diagram of features of an embodiment of an example detector circuit 410 having a selectable RC circuit. The detector circuit 410 can be implemented as the detector 110 of FIG. 1. The detector circuit 410 can include an output node 418, an optical transducer 411, and electronic circuitry 412 having a RC circuit. The RC circuit includes a resistive bank 413, a capacitor bank 416, and one or more switches 414 and 417. Light received at the optical transducer 411 can be converted to a measureable physical property by the optical transducer 411. The measurable physical property can be converted to an electrical signal. The optical transducer 411 can be structured as an optoelectronic device that converts the light to an electrical signal. Examples of such an optoelectronic device include, but are not limited to, photodiodes, phototransistors, photoresistors, photoconductors, and other device whose electrical operation is changed in response to incident light.

A signal from the optical transducer 411 to the output 418 can be processed by the RC circuit provided by a resistive element connected a capacitor, which may have different structural arrangements, to provide selectable variable gain. The selectable variable gain may provide a normalized signal at the output 418 in response to the light incident on the optical transducer 411. With a fixed resistance and variable capacitor, the resistive bank 413 can be structured as a single resistive element with the switch 414 removed. In this configuration, the switch 417 is operable to select one or more capacitors in the capacitor bank 416 for operation of the RC circuit. With a fixed capacitor and variable resistive element, the capacitor bank 416 can be structured as a single capacitive element with the switch 417 removed. In this configuration, the switch 414 is operable to select one or more resistive elements in the resistive bank 416 for operation of the RC circuit. The RC circuit can be arranged with a variable resistive element and a variable capacitive element. In this configuration, the switch 414 is operable to select one or more resistive elements in the resistive bank 416 and the switch 417 is operable to select one or more capacitors in the capacitor bank 416 for operation of the RC circuit.

The resistive elements of resistive bank 413 can be provided by a number of different structures that can include, but is not limited to, resistors, transistors at fixed operating points, and other structures having a controlled resistance. The capacitive elements of capacitor bank 416 can be provided by a number of different structures that can include, but is not limited to, parallel plate-type capacitors, cylindrical capacitors, transistor capacitors, and other structures having a controlled capacitance. The switches 414 and 417 can be provided by a number of different structures that can include, hut is not limited to, transistor switches to select one or more conductive paths, multiplexer with selectable channels, and other structures providing selectable paths for electrical signals.

Control of the switch 414, the switch 417, or the switches 414 and 417 can be provided from control signals applied to the detector circuit 410 from a controller, such as the controller 115 of FIGS. 1A and 1B, where the control signals are correlated with operation of a modulator, such as modulator 105 of FIGS. 1A and 1B, to select appropriate resistive elements and capacitor elements that provide a RC circuit correlated in time with passing of light from the modulator. With the modulator passing light of varying amplitude based on an operating period of the modulator, the selected appropriate resistive elements and capacitor elements provide for normalized signals at the output 418. Control signals from a controller can be applied directly to the switch 414, the switch 417, or the switches 414 and 417. Control signals from the controller can be applied to the switch 414, the switch 417, or the switches 414 and 417 through one or more timing circuits 419. With known varying transmissive characteristics of a modulator with which the detector circuit 410 is arranged, such as the modulator 105 of FIG. 1, control signals can be applied to the switch 414, the switch 417, or the switches 414 and 417 from one or more timing circuits 419 without receiving control signals from a controller external to the detector circuit 410. Operation of the detector circuit 410 with a controller may be realized with a controller integrated with the detector circuit 410.

In various embodiments, the system 100 can be structured to perform a normalizing transformation in the electrical domain by operating electronic components associated with the detector 110. For each modulating element of the modulator 105, the controller 115 can control the electrical gain applied to an electrical signal converted at the detector 110 from radiation received from the respective modulating element. Controlling the electrical gain provides a mechanism to control the amplitude of the resulting signal output from the detector 110 for each modulating element. This approach provides dynamic gain for the system 100. Controlling the electrical gain can include changing a gain resistor in an amplifier of the detector in time with the modulator 105, which can be realized as a chopper wheel.

Figure 5:
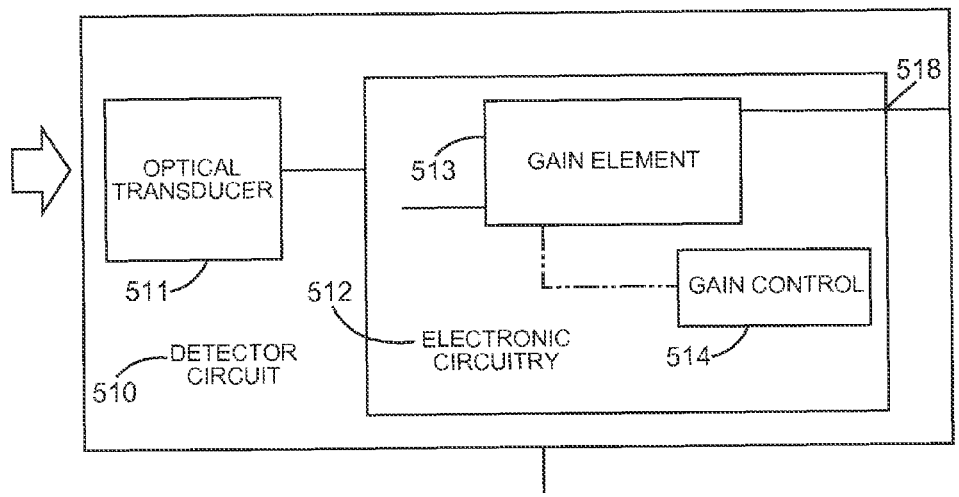
FIG. 5 shows a block diagram of features of an example detector circuit having electronic circuitry that includes again element to provide selectable variable gain, in accordance with various embodiments.

FIG. 5 shows a block diagram of features of an embodiment of an example detector circuit 510 having electronic circuitry that includes a gain element 513 to provide selectable variable gain. The selectable variable gain may provide a normalized signal at an output 518 in response to the light incident on an optical transducer 511. Control signals to the gain element can be generated from a controller such that signals from the optical transducer 511 can be adjusted during an operational period of a modulator from which light is passed to the optical transducer 511. The detector circuit 510 can be implemented as the detector 110 of FIG. 1. Light received at the optical transducer 511 can be converted to a measureable physical property by the optical transducer 511. The measurable physical property can be converted to an electrical signal. The optical transducer 511 can be structured as an optoelectronic device that converts the light to an electrical signal. Examples of such an optoelectronic device include, but are not limited to, photodiodes, phototransistors, photoresistors, photoconductors, and other device whose electrical operation is changed in response to incident light.

The gain element 513 can be controlled from directly from a controller external to the detector circuit 510. The gain element 513 can be controlled from the gain control 514 arranged to interface with a controller external to the detector circuit 510. With known transmissive characteristics of the modulator from which light is directed to the optical transducer 511, the gain control 514 can be structured to control the gain element 513 without a control signal from a controller. The gain element 513 can be modulated to provide a normalized signal at the output 518 in response to the light incident on the optical transducer 511. The detector circuit 510 may be arranged with a modulator having light passing elements that have the same transmissive properties or arranged with a modulator having light passing elements in which at least one light passing element has transmissive different from another light passing element. Operation of the detector circuit 510 with a controller may be realized with a controller integrated with the detector circuit 510.

In various embodiments, the system 100 can be structured to modulate the source 102 while holding the frequency of the modulator 105 constant to perform a normalizing transformation. With the modulator 105 in the form of a chopper, the chopper frequency can be maintained constant. Voltage applied to the source 102 can be varied by the controller 115 to vary the intensity of light emitted from the source 102. The source 102 can be arranged as an array of radiation sources that are controlled to provide more radiation with increasing number of sources energized. The source 102 can be arranged as an array of radiation sources with each radiation source providing different output intensities, where selection of the radiation sources can be synchronized with the modulating elements of the modulator 105. Such synchronization can be attained from feedback from the detector 110 to the controller 115. Light of the source 102 can be modulated by turning the source 102 on and off, leaving the source 102 on longer for filters of the modulator 105 that have low transmissive properties and leaving the source 102 on for a very short period of time for filters that have large transmissive properties. In an embodiment, the maximum period for the on time can be the time a given filter element in the modulator 105 would be presented to the detector 110 based on the frequency of the modulator 105. The minimum on time for a given filter element in the modulator 105 can be the minimum time to prevent signal saturation in the detector 110. The on period may vary for transmissive properties in between the lowest transmissive property and the highest transmissive property. Rather than completely turning the source 102 on and off, the source 102 can be modulated between a high for the lowest transmissive filter and a low for the highest transmissive filter.

Figure 6A:
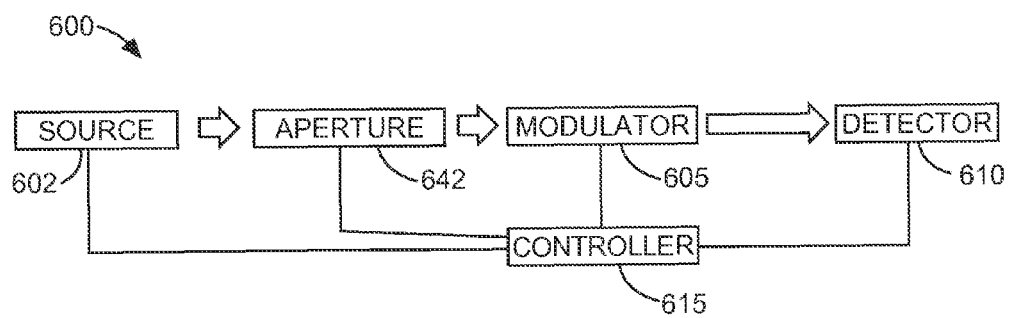
FIGS. 6A and 6B illustrate an example of embodiments of systems, where an aperture that can be arranged with respect to a source and a modulator, in accordance with various embodiments.
Figure 6B:
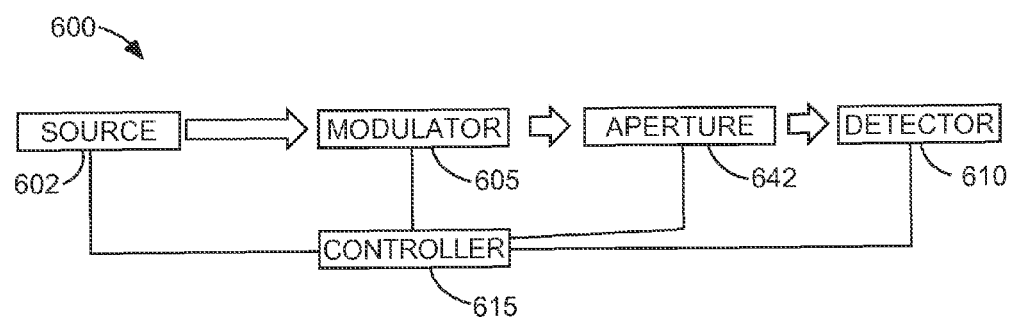

In various embodiments, a system can be structured to contain a variable optical iris or aperture. FIG. 6A illustrates an example of an embodiment of a system 600, where an aperture 642 that can be arranged between a source 602 and a modulator 605. In FIG. 6B, the aperture 642 can be arranged between the modulator 605 and the detector 610. A controller 615 can be operable to control the diameter of the aperture 642 or variable optical iris 642. The controller 615 can adjust the optical diameter of light between the source 602 and the detector 610, therefore controlling the amount of light reaching the detector 610. The aperture 642 can be controlled to provide a large diameter for optical filters with low transmissive properties, and conversely the aperture 642 can be controlled to provide a small diameter for optical filters with high transmissive properties. System 600 can be structured similar to system 100 with the addition of one or more optical irises or apertures.

FIG. 7A shows an example of an embodiment of an arrangement of a second modulator 745 operable with a main modulator 705 between source 702 and detector 710. The second modulator 745 can be structured such that operation of the second modulator 745 can be timed in conjunction with the main optical modulator 705. The timing can be regulated by a controller 715. Such an arrangement can be realized with neutral density filters 744-1 . . . 744-L on a second wheel 744 that is timed in conjunction with the main optical wheel 705 that attenuates the amount of light passing though a particular filter. The second wheel 744 does not necessarily have to contain the same number of optical elements 746-1 . . . 746-N that the main optical wheel 705 contains. The second wheel 745 may contain a single element that has a graduated optical density. The graduated optical density may range from 0-100%.

FIG. 7B shows a structure 748 that can be implemented as the second modulator 745 of FIG. 7A. The structure 748, such as a microscope slide or similar structure, can have a graded transmission across the structure 748 being completely transmissive on one end to very opaque on the other end. The transmission grading is not limited to one being completely transmissive at some region on the structure 748. The graded structure can be moved from side to side at a rate depending on the normalization desired on the elements of the main optical wheel 705. Use of the graded structure 748 allows for the operation of main optical wheel 705 at a constant or at a fixed rate profile with the second modulator 745 providing modulation.

Figure 8A:
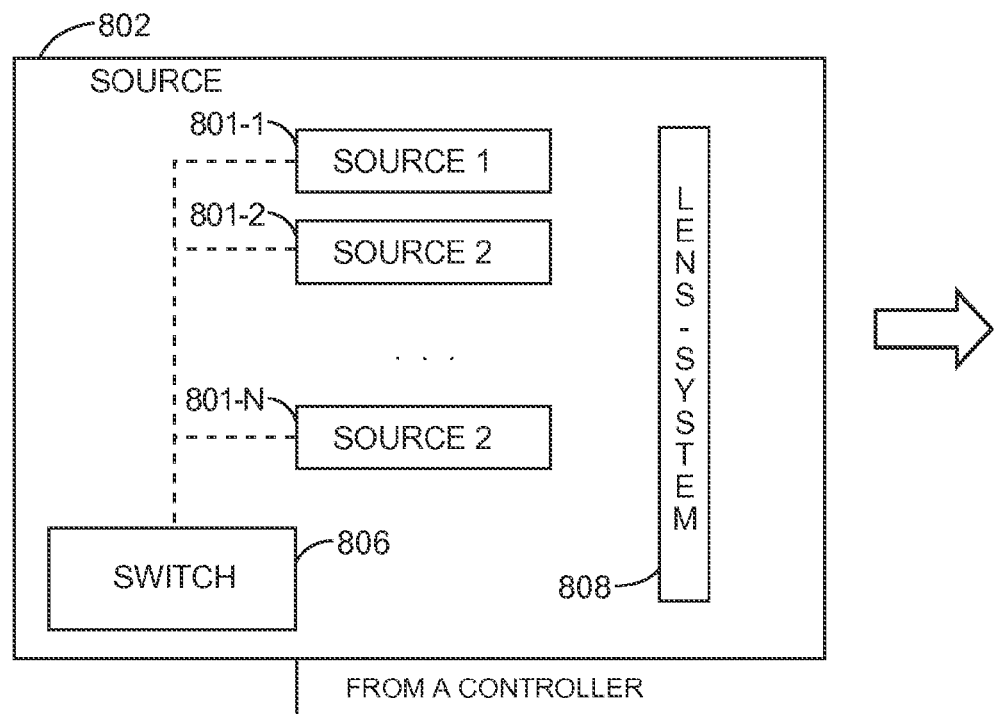
FIG. 8A shows a block diagram of features of an example system source having an array of sources, where one or more of the sources in the array can be selectively activated corresponding to a particular modulating element of a modulator through which light from the source is passed towards a detector, in accordance with various embodiments.
Figure 8B:
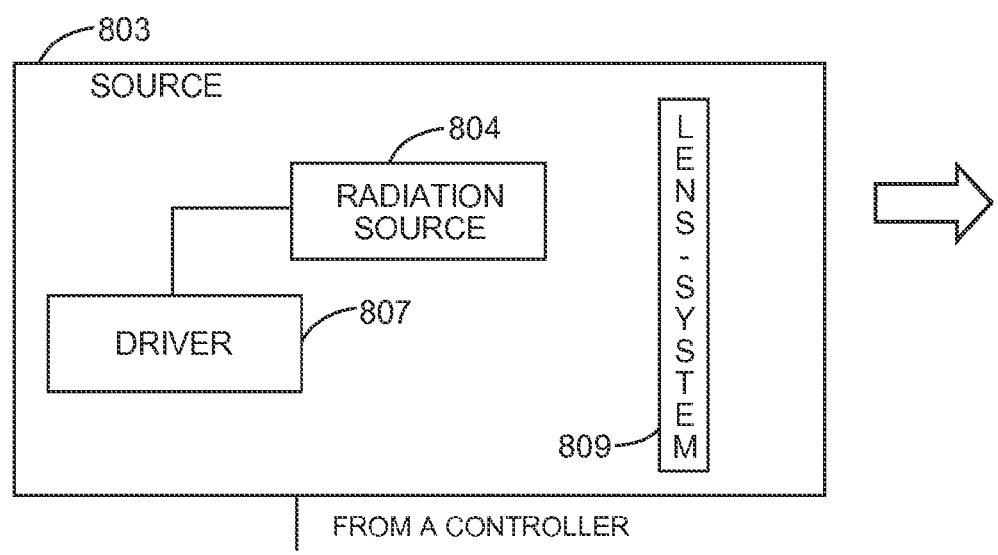
FIG. 8B shows a block diagram of features of an example system source having a radiation source controlled by driver, in accordance with various embodiments.

FIGS. 8A and 8B provide examples of sources 802 and 803, respectively, that can be arranged with a modulator and a detector to provide to provide selectable variable gain. The selectable variable gain may provide a normalized signal at output of the detector in response to light incident on the detector passed through the modulator from sources 802 or 803, respectively. The source 802, the source 803, and combinations of the source 802 and the source 803 can be implemented as source 102 in FIGS. 1A and 1B.

FIG. 8A shows a block diagram of features of an example of an embodiment of the source 802 having an array of sources 801-1, 801-2 . . . 801-N, where one or more of the sources 801-1, 801-2 . . . 801-N can be selectively activated corresponding to a particular modulating element of a modulator through which light from the source 802 is passed towards a detector. Particular ones of the sources 801-1, 801-2 . . . 801-N can be selected from control signals directly from a controller. Particular ones of the sources 801-1, 801-2 . . . 801-N can be selected from control signals from a controller via a switch 806. For the source 802 arranged with a modulator having known transmissive properties, particular ones of the sources 801-1, 801-2 . . . 801-N can be selected from control signals from the switch 806 having timing capabilities without receiving control signals from a controller external to the source 802. The sources 801-1, 801-2 . . . 801-N can be realized as an array of lasers. The sources 801-1, 801-2 . . . 801-N can be realized as an array of laser diodes. Other types of radiation sources can be used. A lens system 808 may be used to direct light from the array to positions external to the source 802.

FIG. 8B shows a block diagram of features of an example of an embodiment of the source 803 having a radiation source 804 controlled by driver 807. The driver 807 can increase and decrease the control signal to the radiation source 804 based on the transmissive characteristics of modulating elements of a modulator with which the source 803 is arranged. The driver 807 can drive the radiation source 804 based on control signals from a controller external to the source 803. For the source 802 arranged with a modulator having known transmissive properties, the driver 807 can provide the drive signal to the radiation source 804 based on timing within the driver 807 without receiving control signals from a controller external to the source 802. A lens system 809 may be used to direct light from the radiation source 804 to positions external to source 803.

In various embodiments permutations of components depicted in FIGS. 1-8 can be used in the various arrangements shown or combinations of these arrangements. These various components and various arrangements of components can be operated in a number of ways to test a sample placed between a modulator and a detector, such as sample 120 between modulator 105 and detector 110, providing a normalized signal in testing the sample. Measurements can be made on the sample relative to the chemical nature of the sample in a variety of material analysis of the sample.

FIG. 9 shows features of an example embodiment of a method to control measurement signals. At 910, radiation is received at a modulator and is passed towards a detector with the received radiation modulated by modulating elements of the modulator. The modulator can have a plurality of modulating elements, where one of the modulating elements has a structure that modulates the radiation differently from another one of the modulating elements. Receiving radiation at a modulator can include receiving radiation at a chopper wheel. Passing, towards the detector, the received radiation modulated by the modulating elements can include passing the modulated radiation through a sample under examination to the detector.

At 920, the modulator is controlled such that, in each period of operation of the modulator on the received radiation, selectable variable gain is provided for received modulated radiation in the detector corresponding to the modulating elements. The selectable variable gain can be provided such that the received modulated radiation from the modulating elements has a normalized amplitude in the detector. Controlling the modulator can include changing speed of a chopper wheel over of each revolution such that a frequency response of the detector provides normalization of amplitude corresponding to each modulating element. Changing the speed of the chopper wheel can include changing the speed of the chopper wheel such that output of the detector is sinusoidal-like or saw-tooth like.

Controlling the modulator can include controlling a main optical modulator timed in conjunction with a second modulator. Controlling the modulator can include controlling the second modulator with neutral de filters on the second modulator. Controlling the modulator includes controls the second modulator having a single element that has a graduated optical density.

A method to control measurement signals can include adjusting an optical diameter of the radiation between a source of the radiation and the detector using a variable optical iris that is arranged between the source and the modulator or a variable optical iris that is arranged between the modulator and the detector. Adjusting the optical diameter of the radiation between the source of the radiation and the detector can be realized using a variable optical iris that is arranged between the source and the modulator and another variable optical iris that is arranged between the modulator and the detector. Such adjustment provides a method of controlling the modulator such that selectable variable gain is provided for received modulated radiation in the detector corresponding to the modulating elements.

In various embodiments, an apparatus comprises a modulator having a plurality of modulating elements, one of the modulating elements having a structure that modulates radiation received at the modulator differently from another one of the modulating elements; a detector arranged to detect a processed signal of the radiation received at the modulator; and a controller to control the modulator such that the modulator, the detector, and the controller operate according to any of the operations associated with 910 and 920.

FIG. 10 shows features of an example embodiment of a method to control measurement signals. At 1010, radiation is received at a modulator and passed towards a detector, where the received radiation is modulated by modulating elements of the modulator. The modulator can have a plurality of modulating elements, where one of the modulating elements has a structure that modulates the radiation differently from another one of the modulating elements. Passing, towards the detector, the received radiation modulated by the modulating elements can include passing the modulated radiation through a sample under chemical examination to the detector.

At 1020, a component in electronic circuitry of the detector is adjusted such that selectable variable gain is provided to signals in the detector from receiving modulated radiation from the modulating elements. The selectable variable gain can be provided such that the received modulated radiation from the modulating elements has a normalized amplitude in the detector. The adjustment of the component can be correlated to each modulating element passing the received radiation. Adjusting the component can include switching a capacitor on an output of the detector synchronously with positions of the modulating elements. A capacitor can be switched into a RC circuit at the output of the detector. Adjusting the component can include adjusting a gain component, controlling amplitude corresponding to the modulated radiation for each modulating element.

In various embodiments, an apparatus comprises a modulator having a plurality of modulating elements, one of the modulating elements having a structure that modulates radiation received at the modulator differently from another one of the modulating elements; and a detector arranged to detect a processed signal of the radiation received at the modulator, the detector having an adjustable component in electronic circuitry such that the modulator and the detector operate according to any of the operations associated with 1010 and 1020.

FIG. 11 shows features of an example embodiment of a method to control measurement signals. At 1110, a source of radiation is modulated and the radiation from the source is directed to a modulator. The modulator can have a plurality of modulating elements, where one of the modulating elements has a structure that modulates the radiation differently from another one of the modulating elements. Modulating a source of radiation can include controlling output from an array of radiation sources. Modulating the source of radiation can include controlling a driver that regulates intensity output from a radiation source. Passing, towards the detector, the radiation modulated by the modulating elements can include passing the modulated radiation through a sample under examination to the detector.

At 1120, a frequency of the modulator is held constant and the radiation from the modulator is passed towards a detector. The radiation from modulating the source is modulated by the modulating elements such that, in each period of operation of the modulator on the radiation, selectable variable gain is provided to the modulated radiation from the modulating elements output of the detector. The selectable variable gain is provided such that the received modulated radiation from the modulating elements has a normalized amplitude in the detector. Holding a frequency of the modulator constant can include holding a frequency of a chopper wheel constant.

In various embodiments, an apparatus comprises a source of radiation, the source capable of being modulated; a modulator arranged to receive the radiation, the modulator having a plurality of modulating elements, one of the modulating elements having a structure that modulates the radiation differently from another one of the modulating elements; and a detector arranged to detect a processed signal of the radiation received at the modulator such that the source, the modulator, and the detector operate according to any of the operations associated with 1110 and 1120.

In various embodiments, systems and methods using variable modulation of radiation and components can increase the signal-to-noise ratios of sensors, which may improve their performance. Such improved performance may be demonstrated by lower limits of detection and enhanced precision of the property being measured. The property being measured may include, but is not limited to % concentration, density, temperature, and other properties that can be measured using radiation and optical techniques.

In various embodiments, an apparatus comprises a source of radiation; a modulator arranged to receive the radiation; and a detector arranged to detect the radiation received at the modulator and modulated by the modulator such that one or more of the source, the modulator and the detector are structured to be operably modulated to provide selectable variable gain for modulated radiation received in the detector. The selectable variable gain can be provided such that the received modulated radiation has a normalized amplitude in the detector. The modulator can have a plurality of modulating elements, one of the modulating elements having a structure that modulates the radiation differently from another one of the modulating elements, where the modulator can be operable to be modulated such that dwell time of each modulating element can be separately controlled. The detector can have electronic components selectable within a period of the modulator. The detector can have capacitive elements, resistive elements, or capacitive elements and resistive elements that can be changed during the period of the modulator. The detector can have gain elements that can be changed during the period of the modulator. The source of radiation can have an array of optical sources arranged such selection of one or more of the optical sources can be changed during a period of the modulator. The source of radiation can have an optical source arranged such that intensity of output from the optical source can be changed during a period of the modulator. The apparatus can include a housing in which the source of radiation, the modulator, and the detector are disposed, where the housing can be structured for operation downhole in a well. The apparatus can include a housing in which the source of radiation, the modulator, and the detector are disposed, where the apparatus operates in a measurement analysis unrelated to a drilling operation associated with a well.

In various embodiments, measurement apparatus and methods as discussed may be implemented to improve performance of process spectrometry. For example, these measurement apparatus and methods can be used, in measurement and analysis systems that use optical sensors and filters to provide adjustable gain to the measured signals including selectively providing gain to portions of a signal within an operating period. Such improvements may be applied to analysis using an optical computation element such as in multivariate optical element (MOE) applications. Industries in with such measurement apparatus and methods can be applied include the oil and gas exploration industry.

Figure 12:
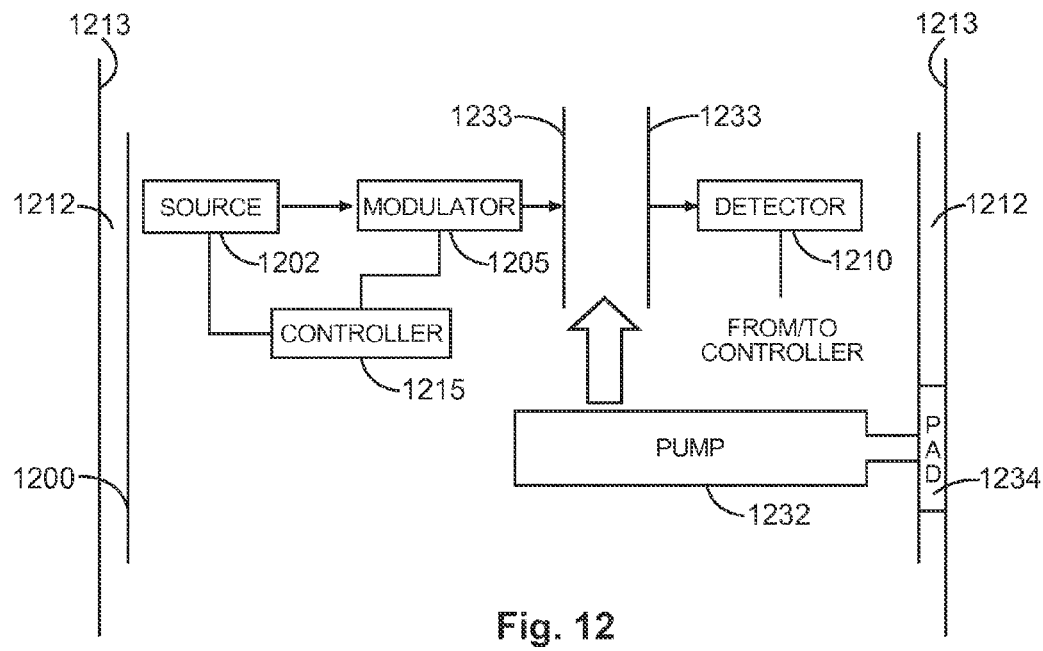
FIG. 12 shows a block diagram of an example arrangement to provide an optical measurement in a downhole tool for operation in a well, in accordance with various embodiments.

FIG. 12 shows a block diagram of an example of an embodiment of an arrangement to provide an optical measurement in a downhole tool 1200 for operation in a borehole 1212 of a well. The downhole tool 1200 can include a pad 1234 and a pump 1232 arranged with the pad 1234 operable to be placed against a borehole wall 1213 to pump fluid out of the formation into the downhole tool 1200 using the pump 1232. The downhole tool 1200 can include a site glass 1233 or a sampling point in the line 1233 arranged to receive the pumped in fluid to analyze the fluid using an optical method with a light source 1202 and modulator 1205, providing an optical filtering system, on one side of the line 1233 and detection optics 1210 on the other side of the line 1233. The optical components can also be arranged with the light source 1202 on one side of the line 1233 and the optical filtering system 1205 and the detection optics 1210 on the other side of the line. The measurement method and optical components can be arranged to provide selectable variable gain by source modulation, by modulation of the optical modulator itself as the modulator operates on light passing through it, by modulation of a converted optical signal in the detection electronics, or a combination of these modulation techniques in a manner similar to or identical to the methods associated with FIGS. 1-11. Controller 1215 can be used in providing the modulation. This selectable variable gain can be implemented to provide a normalization to measurement signals being analyzed with respect to the material in the site glass or a sampling point in the line under study.

The downhole tool 1200 can be implemented in a wireline tool in an open hole operation. Using a wireline tool, a drill bit can be pulled out of the borehole and the wireline tool inserted to make measurements. Among other items, such a wireline tool can provide a reservoir description in an example application. The downhole tool 1200 can be implemented a measurement-while-drilling (MWD) operation, such with a logging-while-drilling (LWD) system, in an open hole operation. In an MWD operation, the drilling can be paused to make the measurements, placing the pad against the borehole wall 1213 and pumping fluid into the downhole tool 1200.

The downhole tool 1200 can be implemented in a gas or oil exploration operating at the surface of the well to make material measurements using optical methods in a manner similar to or identical to the methods associated with FIGS. 1-11. In a surface operation, material can be pumped to the surface. The surface applications may include determining the content of mud, fracturing fluids, cement systems, at the surface to attain the highest resolution possible. Analysis may also be directed to slurries, liquids, pipeline fluids, gases, and water as well.

Various components of a system operable to perform radiation based measurements in which a source, a modulator, a detection system or combinations of these components are controlled to provide selectable variable gain to measurement signals with respect to a period of the modulator, can be realized in combinations of hardware and software based implementations. These implementations may include a machine-readable storage device having machine-executable instructions, such as a computer-readable storage device having computer-executable instructions, to control the measurement system, store and implement parameters for measurements, store results, and communicate with other systems to provide data, analysis, or combinations of data and analysis. Examples of machine-readable storage devices include, but are not limited to, read only memory (ROM), random access memory (RAM), magnetic disk storage device, an optical storage device, a flash memory, and other electronic, magnetic, and/or optical memory devices.

Figure 13:
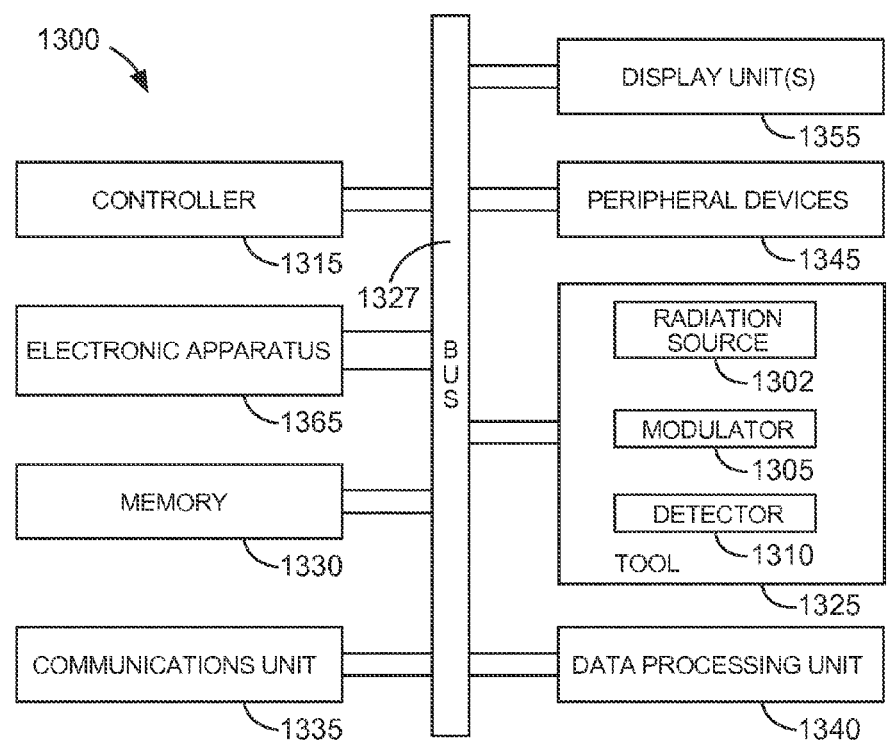
FIG. 13 depicts a block diagram of features of an example system operable to conduct radiation-based measurements on samples, in accordance with various embodiments.

FIG. 13 depicts a block diagram of features of an example embodiment of a system 1300 operable to conduct radiation-based measurements on samples, as described herein or in a similar manner. The system 1300 can include a tool 1325 having an arrangement of a radiation source 1302, a modulator 1305, and a detector 1310 that can be realized in a similar or identical manner to arrangements of components discussed herein. The system 1300 can be configured to operate in accordance with the teachings herein such that selectable variable gain is provided for received modulated radiation in the detector corresponding to the modulating elements of the modulator 1305. Control of the variable gain and select of signals to be enhanced by the variable gain may be conducted in cooperation with a controller 1315. The selectable variable gain may be provided such that the received modulated radiation from the modulating elements has a normalized amplitude in the detector.

In addition to the controller 1315 and the tool 1325 with its components, the system 1300 can include a memory 1330, an electronic apparatus 1365, and a communications unit 1335. The controller 1315, the memory 1330, and the communications unit 1335 can be arranged to operate as a processing unit to control operation of tool 1325 in a manner similar or identical to the procedures discussed herein. A data processing unit 1320, structured to analyze data obtained through application of tool 1325, can be implemented as a single unit or distributed among the components of the system 1300 including electronic apparatus 1365. The controller 1315 and the memory 1330 can operate to control activation of the radiation source 1302, to select of one or more of radiation source 1302, modulator 1305, or detector 1310 to be modulated, and to manage processing schemes in accordance with measurement procedures and signal processing as described herein.

For drilling based operations, the communications unit 1335 can include downhole communications with respect to tool 1325. Such downhole communications can include a telemetry system. The communications unit 1335 may use combinations of wired communication technologies and wireless technologies at frequencies that do not interfere with on-going measurements.

The system 1300 can also include a bus 1327, where the bus 1327 provides electrical conductivity among the components of the system 1300, bus 1327 can include an address bus, a data bus, and a control bus, each independently configured or in an integrated format. The bus 1327 can be realized using a number of different communication mediums that allows for the distribution of components of the system 1300. Use of the bus 1327 can be regulated by the controller 1315.

In various embodiments, peripheral devices 1345 can include additional storage memory and other control devices that may operate in conjunction with the controller 1315 and the memory 1330. In an embodiment, the controller 1315 can be realized as a processor or a group of processors that may operate independently depending on an assigned function.

For a drilling application, the system 1300 can include display unit(s) 1355 as a distributed component on the surface at a drilling operation, which can be used with instructions stored in the memory 1330 to implement a user interface to monitor the operation of the tool 1325 or components distributed within the system 1300. The user interface may be used to input parameter values for thresholds such that the system 1300 can operate autonomously substantially without user intervention. The user interface can also provide for manual override and change of control of the system 1300 to a user. Such a user interface can be operated in conjunction with the communications unit 1335 and the bus 1327.

Figure 14:
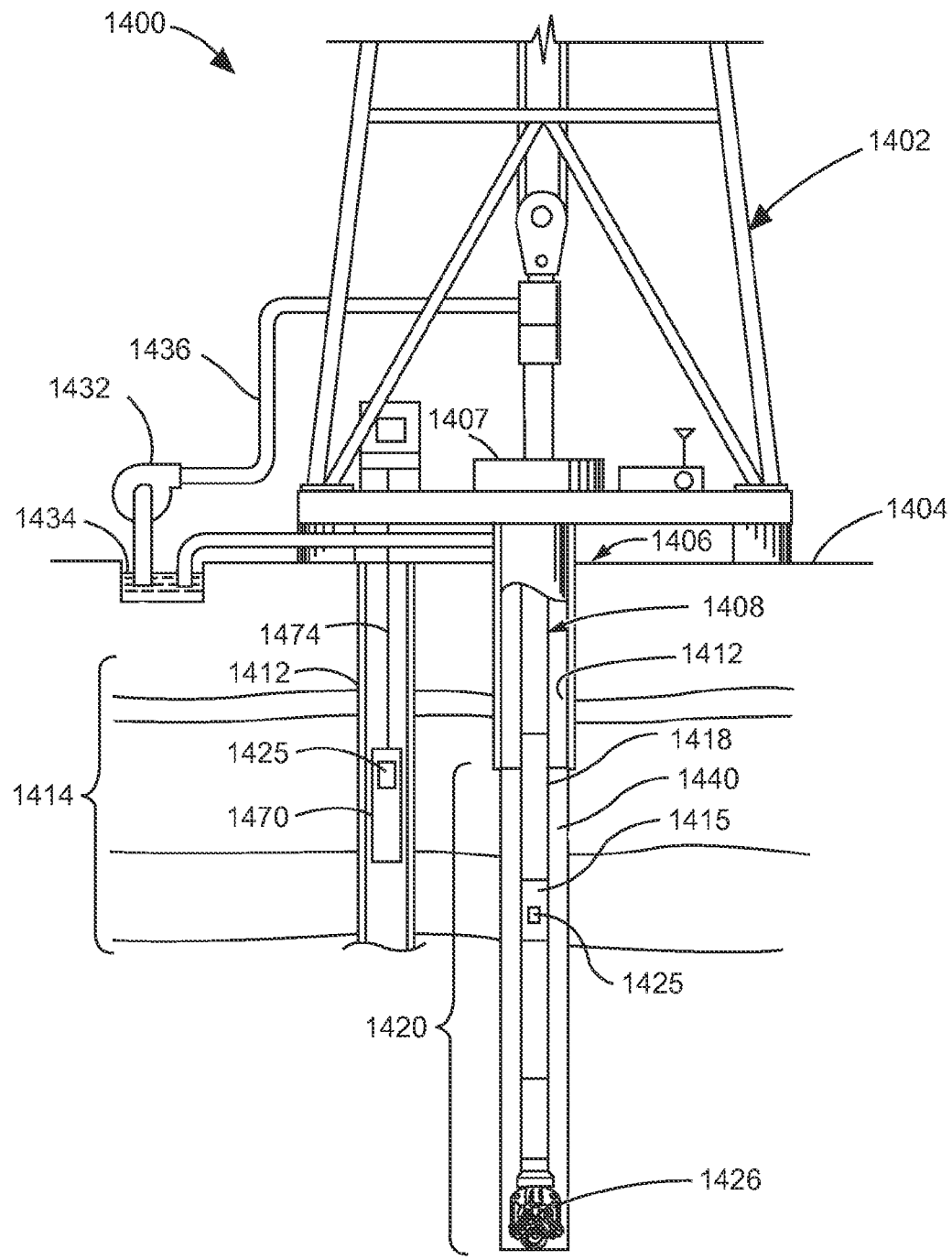
FIG. 14 depicts an example system at a drilling site, where the system includes a tool configured to conduct radiation based measurements on samples, in accordance with various embodiments.

FIG. 14 depicts an embodiment of a system 1400 at a drilling site, where the system 1400 includes a tool 1425 having an arrangement of a radiation source, a modulator, and a detector that can be realized in a similar or identical manner to arrangements of components discussed herein. The system 1400 can be configured to operate in accordance with the teachings herein such that selectable variable gain is provided for received modulated radiation in the detector corresponding to the modulating elements of the modulator of tool 1425. Control of the variable gain and selection of signals to be enhanced by the variable gain may be conducted in cooperation with a controller. The selectable variable gain may be provided with one or more of the radiation source, modulator, and detector of tool 1425 modulated. The selectable variable gain may be provided such that the received modulated radiation from the modulating elements has a normalized amplitude in the detector. The tool 1425 can be structured and fabricated in accordance with various embodiments as taught herein with respect to one or more of its radiation source, its modulator, and its detector modulated to perform radiation based measurements.

The system 1400 can include a drilling rig 1402 located at a surface 1404 of a well 1406 and a string of drill pipes, that is, the drill string 1408, connected together so as to form a drilling string that is lowered through a rotary table 1407 into a wellbore 1412, also referred to as or a borehole 1112. The drilling rig 1402 can provide support for the drill string 1408. The drill string 1408 can operate to penetrate the rotary table 1407 for drilling the borehole 1412 through subsurface formations 1414. The drill string 1408 can include drill pipe 1418 and a bottom hole assembly 1420 located at the lower portion of the drill pipe 1418.

The bottom hole assembly 1420 can include a drill collar 1415, the tool 1425 attached to the drill collar 1415, and a drill bit 1426. The drill bit 1426 can operate to create the borehole 1412 by penetrating the surface 1404 and the subsurface formations 1414. The tool 1425 can be structured for an implementation in the borehole 1412 as a MWD system such as a LWD system. The housing containing the tool 1425 can include electronics to activate one or more radiation sources of the tool 1425 and collect responses from the detector of the tool 1425. Such electronics can include a unit to provide analyzed data to the surface over a standard communication mechanism for operating a well. Alternatively, electronics can include a communications interface to provide signals output by the detector of the tool 1425 to the surface over a standard communication mechanism for operating a well, where these output signals can be analyzed at a processing unit at the surface to provide analysis of the measured and filtered signals.

During drilling operations, the drill string 1408 can be rotated by the rotary table 1107. In addition to, or alternatively, the bottom hole assembly 1420 can also be rotated by a motor (e.g., a mud motor) that is located downhole. The drill collars 1415 can be used to add weight to the drill bit 1426. The drill collars 1415 also can stiffen the bottom hole assembly 1420 to allow the bottom hole assembly 1420 to transfer the added weight to the drill hit 1426, and in turn, assist the drill bit 1426 in penetrating the surface 1404 and subsurface formations 1414.

During drilling operations, a mud pump 1432 can pump drilling fluid (sometimes known by those of skill in the art as "drilling mud") from a mud pit 1434 through a hose 1436 into the drill pipe 1418 and down to the drill bit 1426. The drilling fluid can flow out from the drill bit 1426 and be returned to the surface 1404 through an annular area 1440 between the drill pipe 1418 and the sides of the borehole 1412. The drilling fluid may then be returned to the mud pit 1434, where such fluid is filtered. In some embodiments, the drilling fluid can be used to cool the drill bit 1426, as well as to provide lubrication for the drill bit 1426 during drilling operations. Additionally, the drilling fluid may be used to remove subsurface formation 1414 cuttings created by operating the drill bit 1426.

In various embodiments, the tool 1425 may be included in a tool body 1470 coupled to a logging cable 1474 such as, for example, for wireline applications. The tool body 1470 containing the tool 1425 can include electronics to activate one or more radiation sources of the tool 1425 and collect responses from the detector of the tool 1425. Such electronics can include a unit to provide analyzed data to the surface over a standard communication mechanism for operating a well. Alternatively, electronics can include a communications interface to provide signals output by the detector of the tool 1425 to the surface over a standard communication mechanism for operating a well, where these output signals can be analyzed at a processing unit at the surface o provide analysis of the measured and filtered signals. The logging cable 1474 may be realized as a wireline (multiple power and communication lines), a mono-cable (a single conductor), and/or a slick-line (no conductors for power or communications), or other appropriate structure for use in the borehole 1412.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments mill be apparent to those of skill in the art upon studying the above description.

What is claimed is:

1. An apparatus comprising:
   a modulator having a plurality of modulating elements, one of the modulating elements having a structure that modulates radiation received at the modulator differently from another one of the modulating elements;
   a detector arranged to detect a processed signal of the radiation received at the modulator; and
   a controller to control the modulator such that, in each period of operation of the modulator on the received radiation, selectable variable gain is provided for the processed signal in the detector corresponding to the modulating elements.

2. An apparatus comprising:
   a source of radiation;
   a modulator arranged to receive the radiation, the modulator has a plurality of modulating elements, one of the modulating elements having a structure that modulates the radiation differently from another one of the modulating elements; and
   a detector arranged to detect the radiation received at the modulator and modulated by the modulator such that one or more of the source, the modulator, and the detector are structured to be operably modulated to provide selectable variable gain for modulated radiation received in the detector corresponding to the modulating elements of the modulator such that the selectable variable gain is provided and such that the received modulated radiation has a normalized amplitude in the detector.

3. The apparatus of claim 2, wherein the modulator is operable to be modulated such that dwell time of each modulating element can be separately controlled.

4. The apparatus of claim 2, wherein the detector has electronic components selectable within a period of the modulator.

5. The apparatus of claim 4, wherein the detector has capacitive elements, resistive elements, or capacitive elements and resistive elements that can be changed during the period of the modulator.

6. The apparatus of claim 4, wherein the detector has gain elements that can be changed during the period of the modulator.

7. The apparatus of claim 2, wherein the source of radiation has a array of optical sources arranged such that selection of one or more of the optical sources can be changed during a period of the modulator.

8. The apparatus of claim 2, wherein the source of radiation has an optical source arranged such that intensity of output from the optical source can be changed during a period of the modulator.

9. The apparatus of claim 2, wherein the apparatus includes a variable optical iris that is arranged between the source and the modulator.

10. The apparatus of claim 9, wherein the controller is operable to control the variable optical iris to adjust the optical diameter of light between the source and the detector.

11. The apparatus of claim 2, wherein the apparatus includes a variable optical iris that is arranged between the modulator and the detector.

12. The apparatus of claim 2, wherein the modulator includes a main optical modulator and a second modulator, the main optical modulator operatively timed in conjunction with the second modulator.

13. The apparatus of claim 12, wherein the second modulator includes a neutral density filters.

14. The apparatus of claim 12, wherein the second modulator is arranged as a single element that has a graduated optical density.

15. The apparatus of claim 2, wherein the apparatus includes a housing in which the source of radiation, the modulator, and the detector are disposed, the housing structured for operation downhole in a well.

16. The apparatus of claim 2, wherein the apparatus includes a housing in which the source of radiation, the modulator, and the detector are disposed, the housing structured for operation in a measurement analysis unrelated to a drilling operation associated with a well.

* * * * *